(12) United States Patent  
Azevedo et al.

(10) Patent No.: US 9,103,441 B2  
(45) Date of Patent: Aug. 11, 2015

(54) PISTON PIN FOR HEAT DISSIPATION

(75) Inventors: Miguel Azevedo, Ann Arbor, MI (US); William Zdeblick, Ann Arbor, MI (US); Kai Wang, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 763 days.

(21) Appl. No.: 13/345,851

(22) Filed: Jan. 9, 2012

(65) Prior Publication Data

US 2013/0174728 A1 Jul. 11, 2013

(51) Int. Cl.
*F16J 1/16* (2006.01)
*F16J 1/18* (2006.01)
*F02F 3/18* (2006.01)
*F16J 7/00* (2006.01)

(52) U.S. Cl.
CPC ... *F16J 1/18* (2013.01); *F02F 3/18* (2013.01); *F16J 1/16* (2013.01); *F16J 7/00* (2013.01)

(58) Field of Classification Search
CPC .................. F16J 1/16; F16J 7/00; F02F 3/18
USPC ........................................................... 92/187
See application file for complete search history.

(56) References Cited

U.S. PATENT DOCUMENTS

| | | | |
|---|---|---|---|
| 1,280,117 A | 9/1918 | Winton | |
| 1,777,340 A | 10/1930 | Wallden | |
| 1,910,902 A | 5/1933 | McKone | |
| 1,961,789 A * | 6/1934 | Roth | 403/151 |
| 2,369,907 A | 2/1945 | Moore | |
| 2,386,117 A | 10/1945 | Hvid | |
| 2,742,883 A | 4/1956 | Smith | |
| 3,007,600 A | 11/1961 | Horner | |
| 3,204,617 A | 9/1965 | Hulbert | |
| 3,702,092 A | 11/1972 | Zollner | |
| 3,843,138 A | 10/1974 | Cobb | |
| 4,005,686 A | 2/1977 | Wizemann et al. | |
| 4,026,197 A | 5/1977 | Lapke et al. | |
| 4,364,307 A | 12/1982 | Paro | |
| 4,461,595 A * | 7/1984 | Mallas | 403/154 |
| 4,640,641 A | 2/1987 | Edelmayer | |
| 6,513,477 B1 | 2/2003 | Gaiser et al. | |
| 6,520,069 B2 | 2/2003 | Kennedy et al. | |
| 6,557,457 B1 | 5/2003 | Hart et al. | |
| 7,156,056 B2 | 1/2007 | Lemke et al. | |
| 7,360,511 B2 | 4/2008 | Lemke et al. | |
| 7,549,368 B2 * | 6/2009 | Heidrich et al. | 92/186 |
| 7,591,235 B2 | 9/2009 | Lemke et al. | |
| 7,861,679 B2 | 1/2011 | Lemke et al. | |

FOREIGN PATENT DOCUMENTS

| | | |
|---|---|---|
| EP | 1529992 A2 | 5/2005 |
| EP | 1983232 A1 | 10/2008 |
| GB | 1244588 A | 9/1971 |

OTHER PUBLICATIONS

International Search Report mailed Jun. 21, 2013 (PCT/US2013/020753).

* cited by examiner

*Primary Examiner* — F. Daniel Lopez
(74) *Attorney, Agent, or Firm* — Robert L. Stearns; Dickinson Wright, PLLC

(57) ABSTRACT

A piston assembly including a piston body pivotally connected to a connecting rod by a wrist pin. The wrist pin includes a sealed cavity therein partially filled with a heat transfer medium. The heat transfer medium may be composed of a fusible alloy. The sealed cavity may be comprised of discrete compartments. The wrist pin may be integrated with the connecting rod and share a conjoined sealed cavity therewith so that heat transfer medium can draw heat effectively away from the piston body.

13 Claims, 5 Drawing Sheets

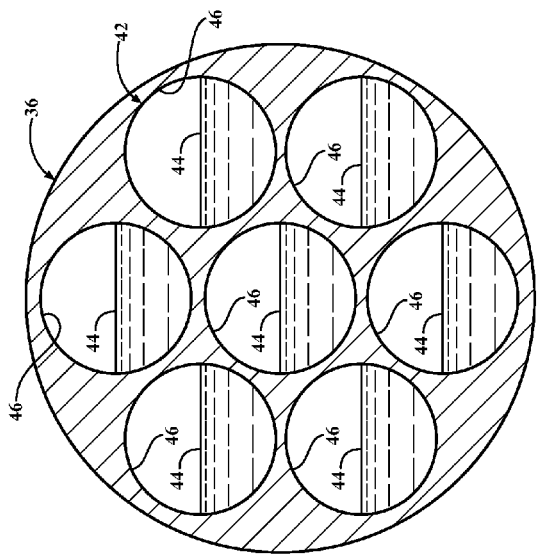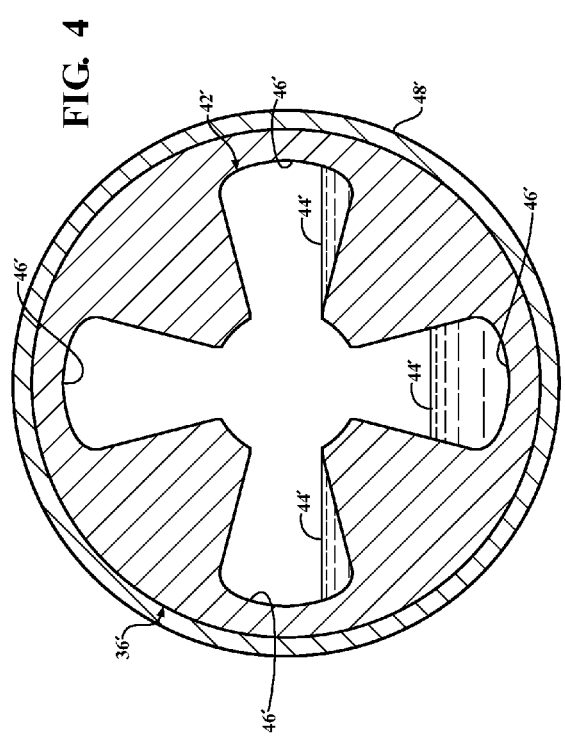

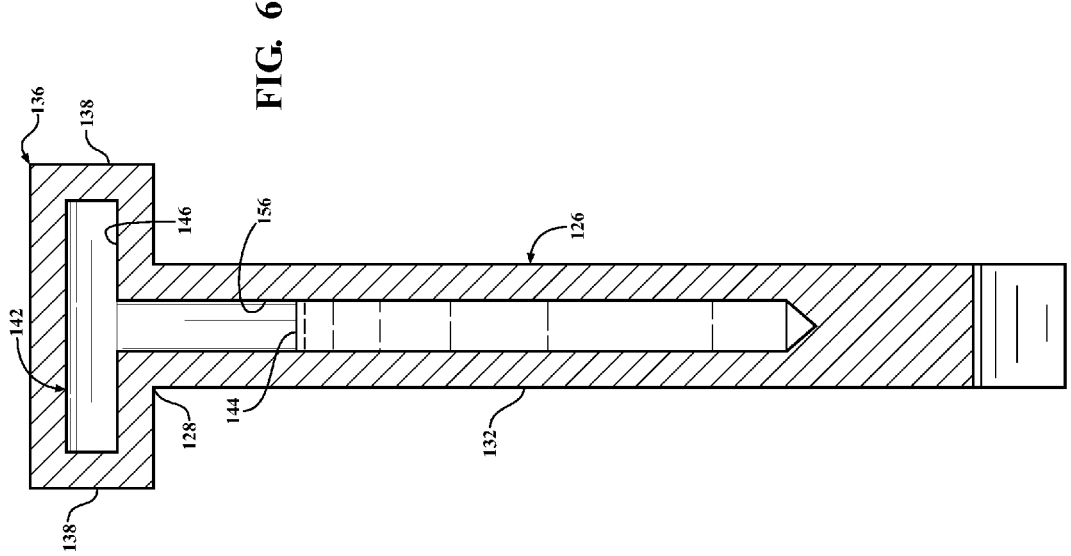

PISTON PIN FOR HEAT DISSIPATION

CROSS REFERENCE TO RELATED APPLICATIONS

None.

BACKGROUND OF THE INVENTION

1. Field of the Invention

This invention relates to pistons for internal combustion engines, and more particularly to a wrist pin as used in piston assemblies to interconnect the piston body to a connecting rod.

2. Related Art

Piston assemblies as used in internal combustion engines are subject in use to extremely high temperatures, forces and inertia. Optimal operation of such engines requires careful management of the temperature of the components of a piston assembly which are typically manufactured from strong, lightweight metal alloys.

A practice long observed in diesel engine applications is to circulate lubricating oil through passages in the piston assembly to serve as both lubricant for the various joints and as a cooling medium to draw heat away from the piston crown. U.S. Pat. No. 2,742,883 to Smith, issued Apr. 24, 1956, disclose one such piston assembly wherein cooling oil is ported through a hollow wrist pin and then moved into an upper gallery formed just under the crown of the piston head.

In another example, U.S. Pat. No. 3,702,092 to Zollner, issued Nov. 7, 1972, discloses a lightweight wrist pin assembly formed with a plurality of open air channels or passages extending completely therethrough. The passages may be circular or have other shapes and range in number from two to six. In certain examples, the passages do not extend completely through but are internally stopped and open only at one end of the wrist pin. The stopped holes or through passages in the wrist pin are created in this case for the purpose of weight reduction.

In yet another example, U.S. Pat. No. 4,005,686 to Wizemann et al., issued Feb. 1, 1997 discloses a piston assembly including a wrist pin having a hollow passage therein open to receive pressurized cooling liquid (i.e., lubricating oil) from the connecting rod. The oil is routed through the wrist pin and into the piston head or crown area.

It has been observed that, at least in diesel applications, pistons operating under a thermal load equal to or higher than 0.4 kW/cm$^2$ generally require forced piston cooling in order to maintain temperatures below 270° C. At least 2 kW is thus required in a 6-cylinder heavy duty truck engine and considerably more as the size and/or specific power (kW/liter) of the engine increases. This forced piston cooling represents a parasitic loss. That is, fuel is burned in order to move this cooling liquid without any corresponding useful power being developed.

There is therefore a need in the art to provide more effective and efficient means by which to rid the crown of a piston of absorbed heat, for the purpose of reducing or eliminating entirely the losses associated with forced cooling. Improved methods are thus sought after with the goal of recovering parasitic losses inherent in prior art engine systems.

SUMMARY OF THE INVENTION

A wrist pin is provided for a piston assembly of the type used in an internal combustion engine. The wrist pin comprises a generally cylindrical outer surface having closed ends. A sealed cavity is formed internal to the outer surface in the closed ends. A fixed quantity of heat transfer medium is trapped inside the cavity.

The heat transfer medium trapped inside the sealed cavity of the wrist pin serves as an additional heat sink to help manage the thermal load in a piston assembly and thereby reduce parasitic losses otherwise required to force cooling liquid through the piston assembly. In other words, the sealed cavity in the wrist pin functions as a heat exchanger that absorbs heat directly from the pin boss structure of a piston body to which it is coupled, thus enabling conductive heat migration away from the piston crown.

According to another aspect of this invention, a piston assembly is provided for use in an internal combustion engine. The piston assembly comprises a piston body including a pair of pin bosses. Each pin boss has a pin bore. The pin bores lie along a common pin bore axis and each has a circumferentially extending pin bore surface. The two pin bore surfaces are spaced from one another by an intervening gap or space. A connecting rod has an upper end disposed in the intervening space between the pin bosses. A wrist pin is disposed within the pin bores of the piston body and is operatively connected to the upper end of the connecting rod to pivotally interconnect the piston body and the connecting rod. The wrist pin includes a sealed cavity therein. A fixed quantity of heat transfer medium is trapped inside the sealed cavity.

The subject invention offers a unique and relatively inexpensive solution to use the wrist pin as an additional heat sink, thereby bringing engine technology one step closer to recovering parasitic losses inherent in prior art systems which require forced piston cooling in order to maintain temperatures below a threshold temperature limit.

BRIEF DESCRIPTION OF THE DRAWINGS

These and other features and advantages of the present invention will become more readily appreciated when considered in connection with the following detailed description and appended drawings, wherein:

FIG. 3 is a cross-sectional view of a wrist pin taken generally along lines 3-3 in FIG. 1;

FIG. 4 is a cross-sectional view as in FIG. 3 but showing an alternative embodiment of the sealed cavity;

FIG. 6 is a cross-sectional view taken generally along lines 6-6 in FIG. 5.

DETAILED DESCRIPTION OF THE PREFERRED EMBODIMENT

Figure 1:
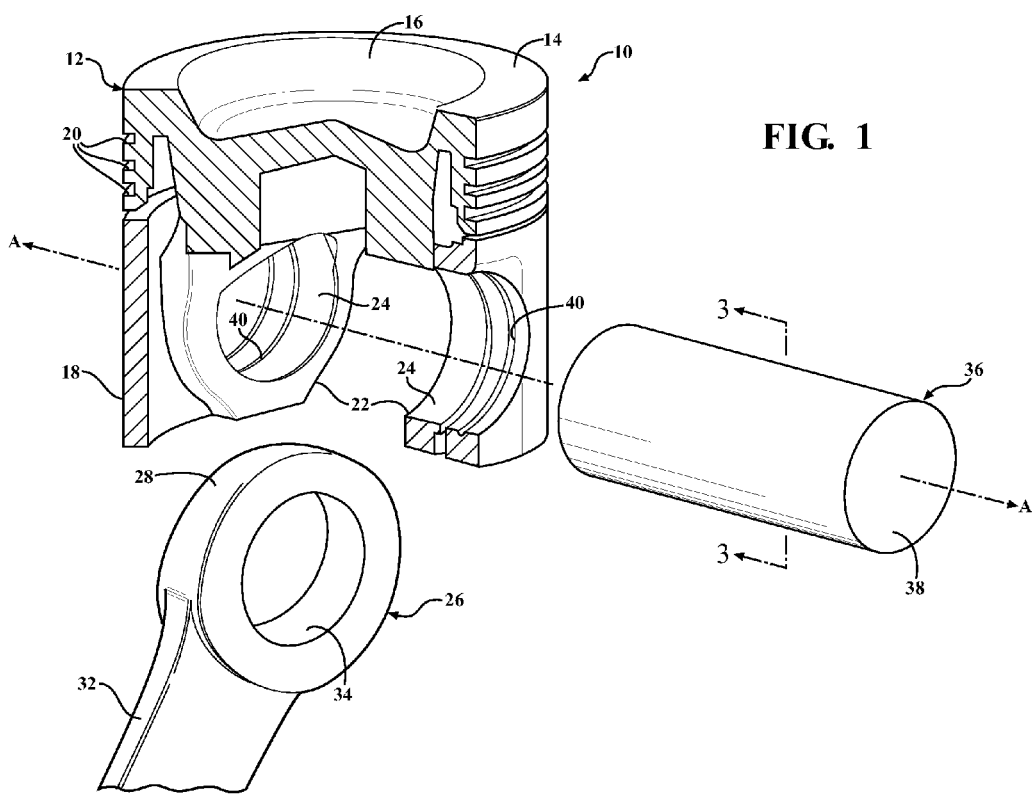
FIG. 1 is an exploded perspective view of a piston assembly showing an exemplary piston body in partial cross-section.
Figure 2:
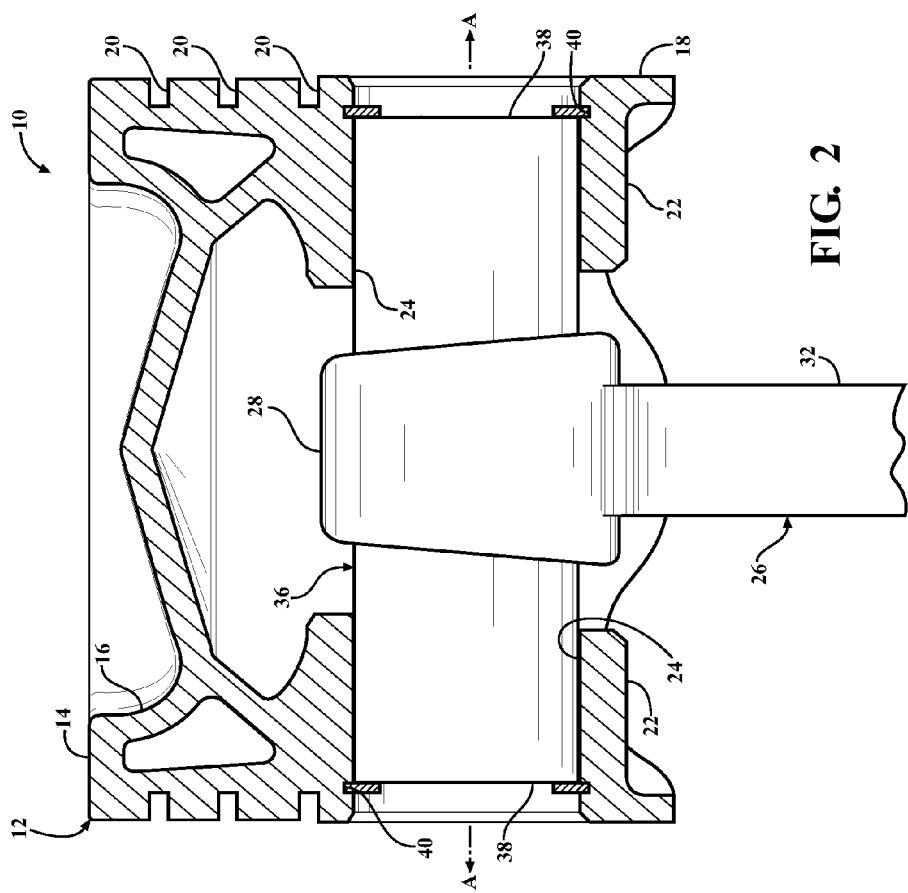
FIG. 2 is a cross-sectional view of another exemplary piston assembly according to an embodiment of the invention.

Referring to the figures wherein like numerals indicate like or corresponding parts throughout the several views, a piston assembly constructed in accordance with preferred embodiments of the invention is generally shown at 10 in FIGS. 1 and 2. The piston assembly 10 includes a piston body, generally indicated at 12. The piston body may be of the single or multi-piece type, and formed with open or closed galleries or other configurations. Those designs shown in FIGS. 1 and 2 are intended for use in diesel engines which is a preferred implementation of this invention, however not the exclusive means by which the novel concepts of this invention may be practiced. As a consequence, the invention herein is applicable to gasoline, natural gas and other types of internal combustion engines in addition to the depicted diesel types. The piston body 12 is formed with a crown 14 at its upper end having, in these examples, a combustion crater or bowl 16. A generally cylindrical skirt 18 extends downwardly from the crown 14. A ring belt may be formed between the crown 14 and skirt 18 so as to contain one or more ring grooves 20 intended to contain piston rings in the customary fashion. A pair of pin bosses 22 extend downwardly from the underside of the crown 14 and are disposed generally within the boundary of the skirt 18. Each pin boss 22 has a pin bore 24 formed therein. The pin bores 24 are disposed along a common pin bore axis A and each have circumferentially extending pin bore surfaces which are spaced from one another by an intervening space or gap. Typically, the pin bores 24 extend through the skirt 18.

A connecting rod is generally indicated at 26. The connecting rod 26 may be any suitable type used in an internal combustion engine to operatively interconnect a rotating crankshaft (not shown) to the reciprocating piston body 12. In particular, the connecting rod 26 in the example shown has an upper end 28, also referred to commonly as the small end. The connecting rod 26 also includes a lower end 30 and a shank 32 extending between the upper 28 and lower 30 ends. Typically, the entire connecting rod 26 is formed as a monolithic structure made in a casting or forging operation or other suitable manufacturing process. The lower end 30 of the connecting rod 26 is designed to couple with the crankshaft in any of the customary fashions.

Within the piston assembly 10, the upper end 28 of the connecting rod 26 is disposed in the intervening space between the pin bosses 22 of the piston assembly 12. In the most typical and preferred embodiments, the upper end 28 is formed with a small end bore 34 which may be sized with a diameter equal to the diameter of the pin bores 24. The small end bore 34 is also aligned along the pin bore axis A so that it is centered together with the pin bores 24.

A wrist pin according to the subject invention is generally indicated at 36. The wrist pin is, preferably, of generally cylindrical configuration having closed ends 38. The wrist pin 36 is sized in terms of both diameter and length to snugly fit within the pin bores 24 and small end bore 34 and to be retained in position there by spring clips seated in clip grooves 40 in the respective pin bores 24. In this manner, the wrist pin 36 pivotally interconnects the piston body 12 and the connecting rod 26 so that the piston body 12 can reciprocate linearly in a cylinder bore (not shown) while the connecting rod 26 is subjected to general plane motion via its lower end 30 connection to a rotating crankshaft (not shown).

As perhaps best shown in FIG. 3, the wrist pin 36 includes a sealed cavity, generally indicated at 42. A fixed quantity of heat transfer medium 44 is trapped inside the sealed cavity 42. Preferably, the heat transfer medium 44 only partially fills the available space inside the sealed cavity 42 so that heat extraction from the inner walls of the cavity 42 can be accomplished with a "cocktail shaker" action during reciprocating motion of the piston body 12. Any suitable material may be used for the heat transfer medium 44 including liquids, pelletized solid materials, and low temperature fusible metals and alloys. A fusible alloy is a metal alloy capable of being easily fused, i.e., easily meltable, at relatively low temperatures. Fusible alloys are commonly, but not necessarily, eutectic alloys. It is known that melted fusible alloys can be used as coolants as they are stable under heating and can give much higher thermal conductivity than many other coolants. Particularly, this may be the case with alloys made with a high thermal conductivity such as indium or sodium. Other suitable fusible metal alloys include lithium based materials and liquids such as sodium-potassium. Other suitable cooling materials may include silicone oil laced with copper or aluminum. The volume of the coolant inside the sealed cavity 42 can vary. Preferably the capacity of the sealed cavity 42 will be filled from 10-50% in order to promote the so-called "cocktail shaker" effect. As shown in FIG. 3, the sealed cavity 42 may be composed of a plurality of distinct compartments 46 rifle-drilled into the wrist pin 36 and sealed with the closed ends 38. In this example, the compartments 46 are isolated from one another so that the heat transfer medium 44 in one compartment 46 cannot migrate into another compartment 46.

FIG. 4 is a cross-sectional view as in FIG. 3 but depicting an alternative embodiment wherein the sealed cavity 42' can be formed as a cartouche formed by any suitable method including casting, sintering or machining from a blank. In this example, prime designations are used to indicate like or corresponding parts with like reference numerals introduced in the preceding embodiment. The sealed cavity 42' is filled partially with the coolant of choice 44' and in the volume range already specified. Internal contours in the cavity 42' form compartments 46' which are not isolated from one another, but in fact open to one another so that the heat transfer medium 44' in one compartment 46' can migrate to another compartment 46'. The internal contours of the sealed cavity 42' are shown here only as one example, with those of skill in the art appreciating that shapes and contours can be varied to suit the process. This embodiment also demonstrates a concept whereby a cartouche is press fit or shrink-fit into a thin steel shell 48' which in turn provides a durable outer surface or sleeve with which to interconnect the connecting rod and piston body. In other words, the shell 48' will act as the bearing element against the pin bores. The cartouche will confer the steel shell 48' with structural stiffness necessary to carry the loads.

Figure 5:
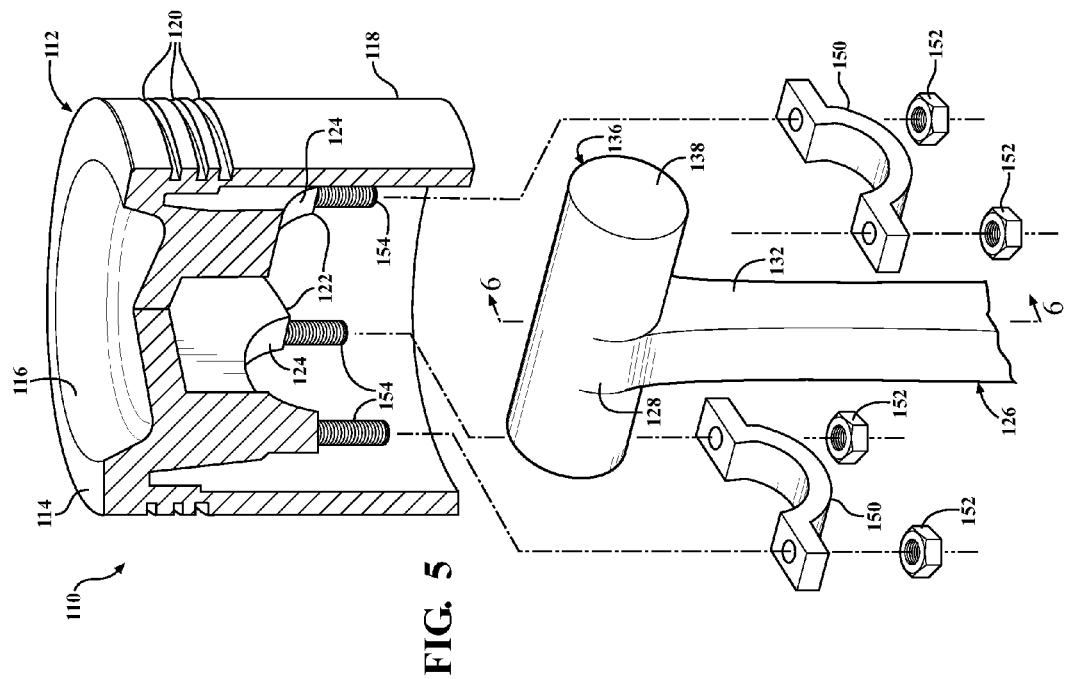
FIG. 5 is an exploded view of a piston assembly according to another alternative embodiment wherein the wrist pin and connecting rod are formed as an integral unit.

Turning now to FIGS. 5 and 6, a still further embodiment of this invention is shown wherein the wrist pin 136 is designed to bear against a saddle 124 machined into the piston undercrown. In the embodiment of FIGS. 5 and 6, like or corresponding reference numerals to those introduced above are offset by 100. In this case, the connecting rod 126 and wrist pin 136 are integrally connected to one another as a unitary structure. Attachment between the two components can be via any suitable technique including bolting, welding, and the like. Cap bearings 150 are attached by nuts 152 to studs 154 depending from the pin bosses 122. Caps and upper bearing surfaces might also be coated with tribological coatings like Manganese Phosphate, DLC (Diamond Like Coating), coatings derived from PVD processes and RoC™ (Robust Coating) comprised by a Chrome matrix and nanodiamonds. In this manner, the wrist pin 136 is captured along the pin bore axis for functional articulation in the well known manner.

As shown in FIG. 6, the wrist pin 136 and connecting rod 126 may be formed with matched rifle drilling that penetrates some into the wrist pin 136 and most of the connecting rod shank 132 length. The sealed cavity in the shank 132 is indicated by reference numeral 156. This cavity 156 is also filled with the coolant of choice and in the same volume range as specified previously. A particular advantage of this construction is that heat load coming from the piston body 112 is dissipated into the wrist pin 136/connecting rod 126 pair and effectively transferred to the connecting rod shank 132 via the heat transfer medium 144. The connecting rod 126 then transfers this heat to the oil film (not shown) flowing through the crank pin (not shown) as well as to the oil mist and air inside the crank case (not shown) of the internal combustion engine in which the assembly 110 is deployed. As will be appreciated by those of skill in this art, the heat transfer path as described is very effective due to the typical dynamics of the components in this assembly 110 and the very high relative speeds in relation to crank case environment.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A wrist pin for a piston assembly of the type used in an internal combustion engine, said wrist pin comprising:
   an inner body having a generally cylindrical outer surface having closed ends;
   a sealed cavity internal to said outer surface and closed ends;
   a fixed quantity of heat transfer medium trapped inside said sealed cavity;
   wherein said sealed cavity comprises a plurality of distinct compartments diametrically opposite one another and open to one another so that the heat transfer medium in one said compartment can migrate to another said compartment; and
   a tubular outer steel shell disposed about said generally cylindrical outer surface of said inner body.

2. The assembly of claim 1, wherein said sealed cavity has a volume, and said heat transfer medium only partially fills said volume.

3. The assembly of claim 2, wherein said heat transfer medium fills said sealed cavity volume in the range of about 10-50%.

4. The assembly of claim 1, wherein said heat transfer medium comprises a low-temperature fusible composition.

5. A wrist pin for a piston assembly of the type used in an internal combustion engine, said wrist pin comprising:
   a generally cylindrical outer surface having closed ends;
   a sealed cavity internal to said outer surface and closed ends;
   a fixed quantity of heat transfer medium trapped inside said sealed cavity; and
   further including a connecting rod, said connecting rod having an upper end directly connected to said wrist pin as a unitary structure, said connecting rod including a shank extending from said upper end thereof, and wherein said shank includes a sealed cavity therein containing a quantity of said heat transfer medium.

6. The assembly of claim 5, wherein said sealed cavity in said shank is in fluid communication with said sealed passage of said wrist pin.

7. A piston assembly for use in an internal combustion engine, said assembly comprising:
   a piston body, said piston body including a pair of pin bosses, each of said pin bosses having a pin bore therein, said pin bores being disposed about a common pin bore axis and each having circumferentially extending pin bore surfaces which are spaced from one another by an intervening space;
   a connecting rod, said connecting rod having an upper end disposed in said intervening space between said pin bosses;
   a wrist pin having an inner body with a generally cylindrical outer surface, said wrist pin disposed within said pin bores of said piston body and operatively connected to said upper end of said connecting rod to pivotally interconnect said piston body and said connecting rod, said wrist pin including a sealed cavity therein, a fixed quantity of heat transfer medium trapped inside said sealed cavity;
   wherein said sealed cavity comprises a plurality of distinct compartments diametrically opposite one another and open to one another so that the heat transfer medium in one said compartment can migrate to another said compartment; and
   a tubular outer steel shell disposed about said generally cylindrical outer surface of said inner body.

8. The assembly of claim 7, wherein said sealed cavity has a volume, and said heat transfer medium only partially fills said volume.

9. The assembly of claim 8, wherein said heat transfer medium fills said sealed cavity volume in the range of about 10-50%.

10. The assembly of claim 7, wherein said heat transfer medium comprises a low-temperature fusible composition.

11. The assembly of claim 10, wherein said low-temperature fusible composition is selected from the group consisting essentially of metals, metal alloys, NAK and silicone oil.

12. A piston assembly for use in an internal combustion engine, said assembly comprising:
   a piston body, said piston body including a pair of pin bosses, each of said pin bosses having a pin bore therein, said pin bores being disposed about a common pin bore axis and each having circumferentially extending pin bore surfaces which are spaced from one another by an intervening space;
   a connecting rod, said connecting rod having an upper end disposed in said intervening space between said pin bosses;
   a wrist pin, said wrist pin disposed within said pin bores of said piston body and operatively connected to said upper end of said connecting rod to pivotally interconnect said piston body and said connecting rod, said wrist pin including a sealed cavity therein, a fixed quantity of heat transfer medium trapped inside said sealed cavity; and
   wherein said connecting rod includes a shank extending from said upper end thereof, said shank including a sealed cavity therein containing a quantity of said heat transfer medium.

13. The assembly of claim 12, wherein said sealed cavity in said shank is in fluid communication with said sealed passage of said wrist pin.

* * * * *